United States Patent
De Rafael et al.

(10) Patent No.: US 6,529,878 B2
(45) Date of Patent: Mar. 4, 2003

(54) SYSTEM FOR REWARDING VIEWERS OF INTERACTIVE COMMERCIAL ADVERTISEMENTS

(76) Inventors: Carey A. De Rafael, 6 Bishop La., Menlo Park, CA (US) 94025; Rafael Amezcua Arreola, 2528 Soderblom Ave., San Diego, CA (US) 92122

( * ) Notice: Subject to any disclaimer, the term of this patent is extended or adjusted under 35 U.S.C. 154(b) by 0 days.

(21) Appl. No.: 09/272,153

(22) Filed: Mar. 19, 1999

(65) Prior Publication Data

US 2002/0116256 A1 Aug. 22, 2002

Related U.S. Application Data

(63) Continuation-in-part of application No. 08/822,874, filed on Mar. 24, 1997, now abandoned.

(51) Int. Cl.[7] .............................................. G06F 17/60
(52) U.S. Cl. ............................................ 705/14; 705/10
(58) Field of Search ...................... 705/14, 10

(56) References Cited

U.S. PATENT DOCUMENTS

| | | | | |
|---|---|---|---|---|
| 5,034,807 A | * | 7/1991 | Von Kohorn | 725/5 |
| 5,220,501 A | * | 6/1993 | Lawlor et al. | 705/40 |
| 5,643,088 A | * | 7/1997 | Vaughn et al. | 463/40 |
| 5,717,923 A | * | 2/1998 | Dedrick | 707/102 |
| 5,915,243 A | * | 6/1999 | Smolen | 705/14 |

FOREIGN PATENT DOCUMENTS

WO    WO 97/22074    * 6/1997

OTHER PUBLICATIONS

Rohrbough, Linda, "Interactive Ads to Become Major Marketing Tool", Newsbytes News Network, Mar. 29, 1994.*

* cited by examiner

*Primary Examiner*—Donald L. Champagne
(74) *Attorney, Agent, or Firm*—Needle & Rosenberg, P.C.

(57) ABSTRACT

A system and method for compensating users for responding to advertisements in an interactive manner poses questions for users and dynamically generates further questions in response to users' answers to previous questions. A user sets up an account on a remote computer that is then credited each time a user has completed the series of questions and answers relating to an advertisement. In setting up the account, the remote computer obtains demographic information from the user, such as the user's name, age, gender, place of residence and occupation. The remote computer can generate the questions not only in response to answers to previous questions but also in response to the demographic information. The remote computer provides the advertisers with the users' answers or with statistical information computed in response to the answers and the user demographics.

5 Claims, 4 Drawing Sheets

SYSTEM FOR REWARDING VIEWERS OF INTERACTIVE COMMERCIAL ADVERTISEMENTS

CROSS-REFERENCE TO RELATED APPLICATION

This is a continuation-in-part of application Ser. No. 08/822,874, filed Mar. 24, 1997, now abandoned incorporated herein in its entirety by this reference.

BACKGROUND OF THE INVENTION

1. Field of the Invention

The present invention relates generally to advertising in electronic media such as the Internet and television and, more specifically, to systems for rewarding persons for viewing an advertisement and systems for gathering statistical or demographic information about persons who view an advertisement.

2. Description of the Related Art

Manufacturers, retailers, service providers, politicians, citizens' groups and others have long promoted their goods, services and causes by placing advertisements in electronic media. Electronic advertisements typically include some combination of dialogue, live action, graphics and text that is presented to the user via television, the Internet or other media. Advertisements on the Internet, which is the name currently given to the global computer network that allows users anywhere in the world to retrieve and exchange myriad types of multimedia information, typically consist of so-called "banners" that are displayed on the user's computer screen while the user is retrieving information. Banner advertisements generally do not involve user interaction, though certain banner advertisements may include hyperlinks that allow the user to access related information.

It is of importance to advertisers to gather statistical or demographic information relating to potential consumers of their goods or services so that the advertisers can target the persons most likely to be interested in their goods and services and so that the advertisers can adjust their goods and services to suit consumers' tastes. For example, advertisers would be interested in the age of persons to whom a certain product or service is of interest.

Regardless of the advertising medium, advertisers consider it of utmost importance for the advertisement to attract a viewer's attention, because an advertisement that is not viewed by the potential consumers or other target audience is of little value to the advertiser. To attract the attention of potential viewers, advertisers may use attractive graphics or live action and engaging dialogue or music. Nevertheless, because they are continually bombarded by such advertisements, many potential viewers have become resistant to advertisers' techniques to attract them. A system for encouraging potential viewers to view advertisements on the Internet is disclosed in U.S. Pat. No. 5,794,210, issued to Goldhaber et al. A user of the Internet is given the opportunity to set up an account, which is credited with some amount of valuable credit in compensation for the user viewing an advertisement the user selects from an array of choices. The advertisements are of the type typically presented via the Internet in the sense that the user passively reads or listens to the information presented in the advertisement. The system cannot ensure that a user actually reads the advertisement. A user could easily ignore the substance of the advertisement and merely follow the required steps by rote in order to receive credit.

It would be desirable to provide a system that rewards users for viewing advertisements, is more engaging for users and thus more likely to maintain their interest; improves the likelihood that users absorb the substance of the advertisements, and provides useful feedback to the advertisers regarding consumer preferences and demographics. These problems and deficiencies are clearly felt in the art and are solved by the present invention in the manner described below.

SUMMARY OF THE INVENTION

The present invention relates to a system and method for compensating users for responding to advertisements in an interactive manner. Advertisers, such as manufacturers, retailers, service providers, associations, clubs and others who advertise via conventional electronic media, devise interactive advertisements that pose questions for users and generate further questions in response to users' previous answers. Through this question-and-answer-format, the advertiser learns more about the user, and the user in turn learns more about the advertiser. The advertisements are stored in a database on a central computer operated by a company that publishes the advertisements via a suitable wide-area interactive electronic medium, such as the Internet or an interactive television system. The company may receive fees from the advertisers for performing its publishing and processing services.

In accordance with the method, a user establishes communication between his or her own computer and the remote, central processing computer via a suitable wide-area communications medium. The term "computer" is used in this patent specification to refer to any suitable interactive electronic device that can communicate remotely, and is not limited to a conventional, general-purpose personal computer. Similarly, the communications medium is not limited to the global, wide-area network commonly referred to as the Internet. Although in an exemplary embodiment of the invention described in this patent specification the computer is a conventional personal computer communicating via that sub-system of the Internet currently referred to as the World Wide Web, other embodiments may include other devices communicating via other interactive media, such as a so-called set-top box communicating via an interactive cable television or satellite television network.

The user sets up an account on the remote computer by inputting certain requested information. This information may include, for example, the user's name, residence address, age, and any other demographic information that an advertiser may wish to know about the persons who view its advertisements. Whenever the user desires to view advertisements, the user logs into the remote computer in a suitable manner that identifies the user and allows the remote computer to determine the account corresponding to that user.

The user then selects one of the advertisements stored in the database in a suitable manner. For example, the remote computer may display on the user's computer a list of advertisement titles, descriptive phrases or slogans for the user, and the user may select one of them. Alternatively, for example, the remote computer may provide a directory or a keyword search engine that the user can use to find an advertisement relating to certain subject matter that interests the user.

In accordance with the advertisement selected by the user, the remote computer displays questions for the user. The database includes a list of questions corresponding to each advertisement and an algorithm for selecting the next question in response to the user's answer to one or more previous questions. In other words, at least some of the questions are dynamically generated in response to users' answers. Such interactivity maximizes the likelihood that a user pays attention to the advertisement because the user is actively involved in the process. In certain embodiments of the invention, the questions may further be generated in response to the user's demographics. For example, a certain question may be asked only if the user is under 30 years of age and answered "Yes" to the previous question. The algorithm ensures that the sequence of questions and answers, although dynamically generated, is finite in length. When the user responds to the final question of the sequence, the remote computer credits the user's account.

The credit represents value or consideration forth user having answered the questions. The user can later redeem the credits in a suitable manner. For example, in certain embodiments of the invention the user can periodically request a cash payment representing the credit balance of his or her account. In other embodiments, the user may receive a sweepstakes entry or certificates or coupons that he or she can redeem for goods or services provided by the advertiser or others. In still other embodiments, the credit may be used electronically in a manner analogous to cash, i.e., to purchase goods or services via an electronic transaction, and the user's account is debited as part of the transaction.

From time to time, the remote computer transmits information to each advertiser in response to users having viewed and interacted with the advertiser's advertisement. In certain embodiments of the invention, the information may be the answers themselves. The advertiser can use the information in any suitable manner. In other embodiments, the information may be statistical information that the remote computer computes in response to the answers and the user demographics. For example, an advertiser may wish to know the average age or the total number of persons of a certain gender, city of residence, political affiliation, or occupation, who viewed its advertisement, or similar demographic statistical information of all persons who answered "Yes" to a certain question or whose answers followed a certain predetermined pattern. Such information is highly useful to advertisers because it aids them in targeting their advertisements and responding to consumer preferences.

The foregoing, together with other features and advantages of the present invention, will become more apparent when referring to the following specification, claims, and accompanying drawings.

DESCRIPTION OF THE DRAWINGS

For a more complete understanding of the present invention, reference is now made the following detailed description of the embodiments illustrated in the accompanying drawings, wherein.

DESCRIPTION OF A PREFERRED EMBODIMENT

Figure 1:
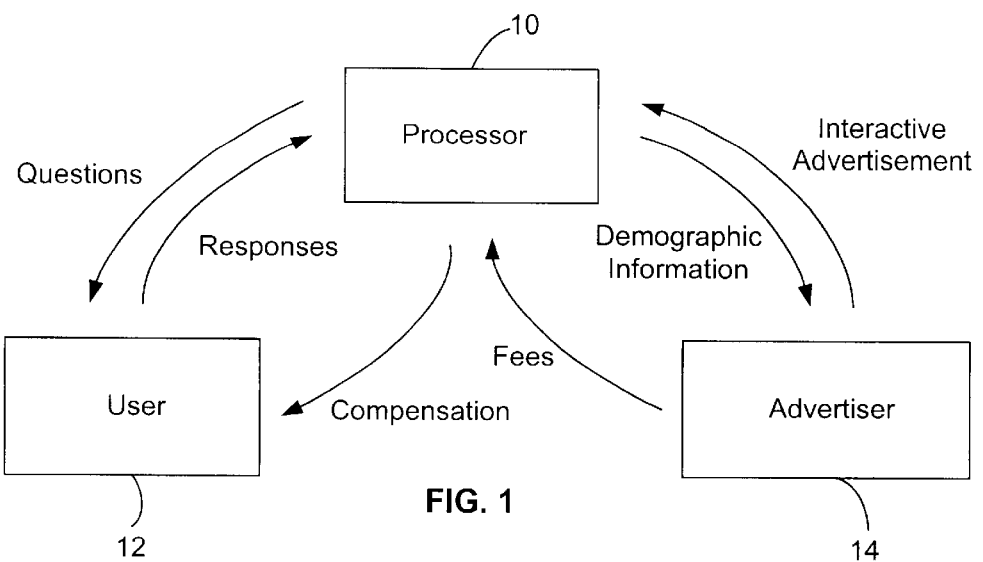
FIG. 1 illustrates a system in which users are compensated for responding to advertisements, and advertisers receive demographic information relating to users who responded to their advertisements.

As illustrated in FIG. 1, the system and method of the present invention relate to a processor 10, a user 12 and an advertiser 14, who are companies or individuals. Although only one user 12 and advertiser 14 is shown for purposes of clarity, there are many users 12 and advertisers 14. As described in further detail below, processor 10 hosts or publishes interactive electronic advertisements that are provided by each advertiser 14. A user can select one of these advertisements. In accordance with the selected advertisement, processor 10 asks questions of user 12, and user 12 provides answers in response. Processor 10 forwards to each advertiser 14 the answers that it has received and statistical demographic information it has computed in response to users having selected and interacted with the advertisement. Processor 10 credits an account established for each user 10 who has selected and interacted with an advertisement in compensation or consideration for user 10 having participated in this manner. A user 10 can use this compensation to obtain products or services of value.

Figure 2:
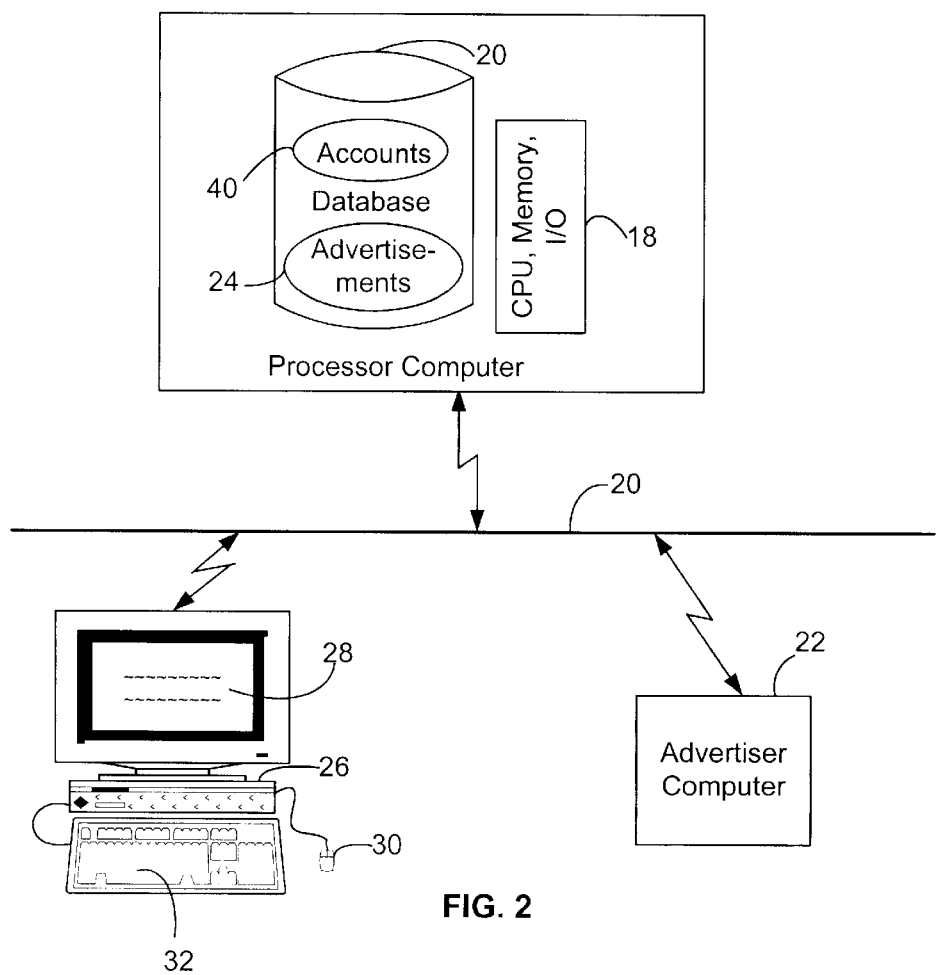
FIG. 2 illustrates a user computer, a remote computer and an advertiser computer communicating via a global computer network in accordance with a method the invention.

As illustrated in FIG. 2, processor 10 has a remote computer 16 located remotely from each user 12. Computer 16 is preferably a suitable commercially available minicomputer that includes the conventional computing elements 18 that define a general purpose digital computer, such as a central processing unit, memory, input/output circuitry, and software. These elements are not shown in detail for purposes of clarity but are well-known to those persons skilled in the art. Computer 16 is configured to operate as a server in a client-server network, serving remotely located client computers via the Internet 20 in accordance with suitable programming. The programming includes, in addition to that which is conventional to a typical Internet server computer, programming that effects the present invention. In view of the descriptions in this patent specification, persons skilled in the art will readily be capable of writing suitable software and of otherwise programming computer 16 to effect the present invention. Nevertheless, the present invention may be effected by means of any suitable combination of hardware and software.

Computer 16 also includes a database 20. Database 20 may be a commercially available relational database product such as those produced by ORACLE and SYBASE. Nevertheless, the term "database" is used only for purposes of convenience, and database 20 may be any suitable data storage and retrieval structure.

Advertiser 14 has an advertiser computer 22 that communicates with remote computer 16 via Internet 20. Advertiser 14 can establish a business relationship with processor 10 that allows advertiser 14 to store interactive advertisements 24 in database 20. In this exemplary embodiment, an interactive advertisement 24 includes a set of documents defined by the hypertext mark-up language (HTML), an algorithm for selecting the next document to display, and algorithms for computing statistics of interest to advertiser 14.

User 12 has a computer 26 that communicates with remote computer 16 via Internet 20 in accordance with the hypertext transfer protocol (HTTP) and other protocols that define the sub-system of the Internet 20 commonly known as the World Wide Web or simply "the Web." As well-known in the art, to access Web documents or pages, a computer functioning as a client computer executes software known as a browser. Computer 26 is preferably a conventional personal computer and includes all conventional hardware and software elements necessary to communicate with remote server computers via Internet 20. These elements are not described in this patent specification for purposes of clarity. Computer 26 displays Web pages that it retrieves in this manner within a browser window 28. In addition to the Web pages themselves, the browser also causes to be displayed various buttons and similar graphical control structures that user 12 can activate to control various functions of the browser, as well-known in the art. The browser is preferably a commercially available software product such as those produced by NETSCAPE COMMUNICATIONS INC. and MICROSOFT CORPORATION. To activate such buttons and to activate hyperlinks that are embedded in the Web page displayed in browser window 28, user 12 uses a mouse 30 or similar pointing device to direct the cursor to the graphical control structure or hyperlink and activates the pointing device, e.g., by clicking a button on mouse 30. This procedure is commonly referred to simply as "clicking on" the button or hyperlink. In response to clicking on a hyperlink, the browser requests a Web page from an Internet resource specified by the hyperlink, and may also transmit information the user has entered into the then-displayed Web page. In addition to mouse 30, computer 26 includes a keyboard 32 for entering information. Voice-recognition and other well-known alternative input means (not shown) are also included in some computer systems to direct the cursor, activate graphical control structures, and enter information.

Figure 3:
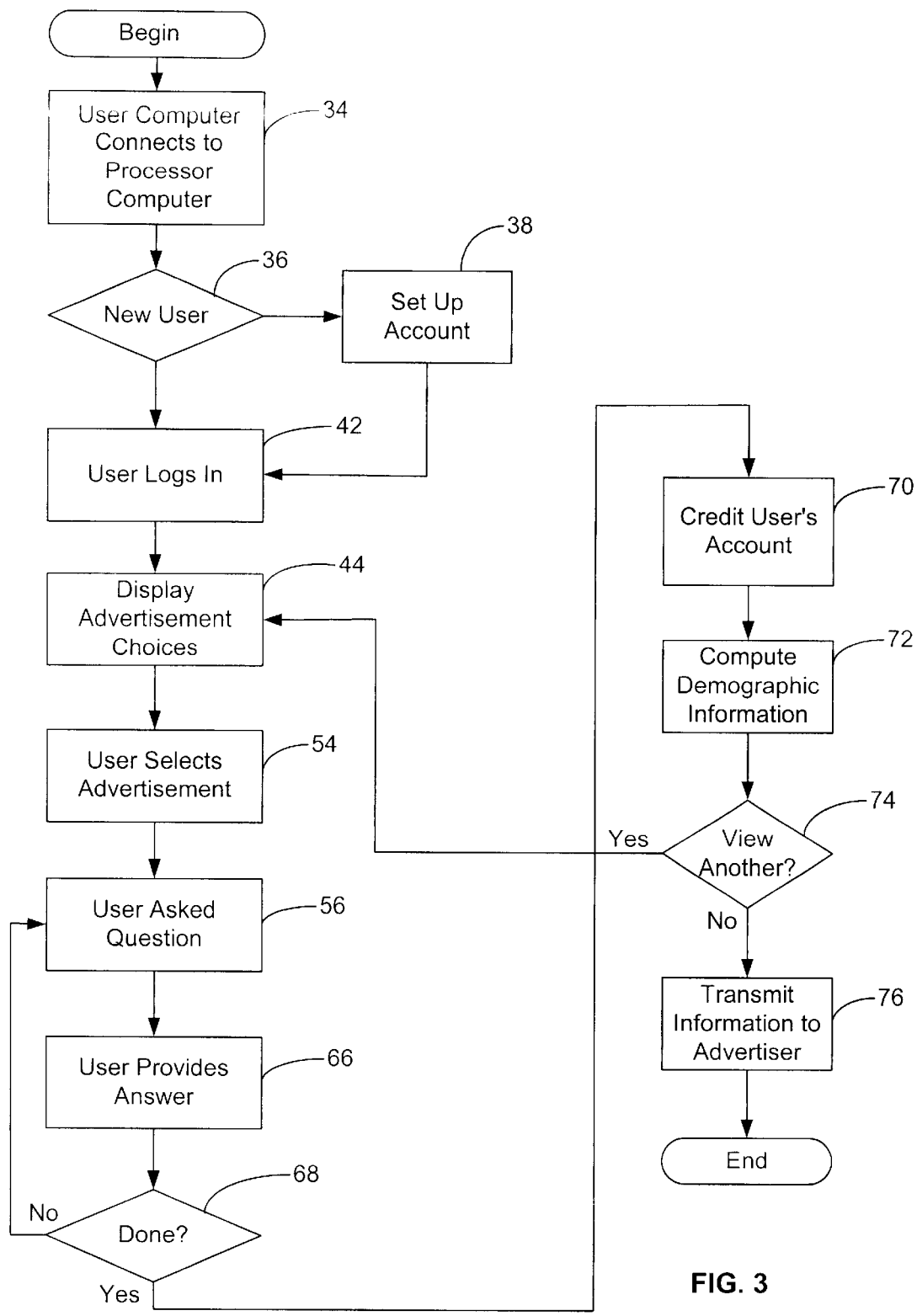
FIG. 3 is a flowchart illustrating a method of the invention by which users are compensated for responding to advertisements, and advertisers receive demographic information relating to users who responded to their advertisements.

The method by which user 12 interacts with advertisements 24 is illustrated in FIG. 3. User 12 uses computer 26 to communicate Web pages with remote computer 16 in the manner described above. At step 34, user 12 causes computer 26 to initially establish communication with remote computer 16 by, for example, typing a uniform resource locator (URL) that the browser transmits via Internet 20. In response to such a request from computer 26, remote computer 16 transmits an initial Web page (not shown) to computer 26 that welcomes user 12 and identifies the business system operated by processor 10 by, for example, the name of PAID-TO-VIEW™, and requests that user 12 log in or, if user 12 is not yet registered with the PAID-TO-VIEW™ system, that user 12 set up an account. User 12 responds by clicking on an appropriate button, hyperlink or other control structure to indicate whether user 12 is a new user.

If remote computer 16 determines at step 36 that user 12 is a new user, then at step 38 computer 16 transmits a Web page (not shown) that is a form having boxes and other graphical input structures into which user 12 can enter identifying and demographic information. The information preferably includes the name, residence address, age, gender, and occupation of user 12, but may include any pertinent demographic information. User 12 enters the requested information, plus a username and password and submits this form to computer 16 by clicking on a button. In response, computer 16 transmits to user 12 a Web page that includes confirmation that user 12 is registered with the PAID-TO-VIEW™ system. Computer 16 also establishes an account 40 in database 20 (FIG. 2). Database 20 can include an account 40 corresponding to each user 12 who registers with the PAID-TO-VIEW™ system in this manner.

Figure 4:
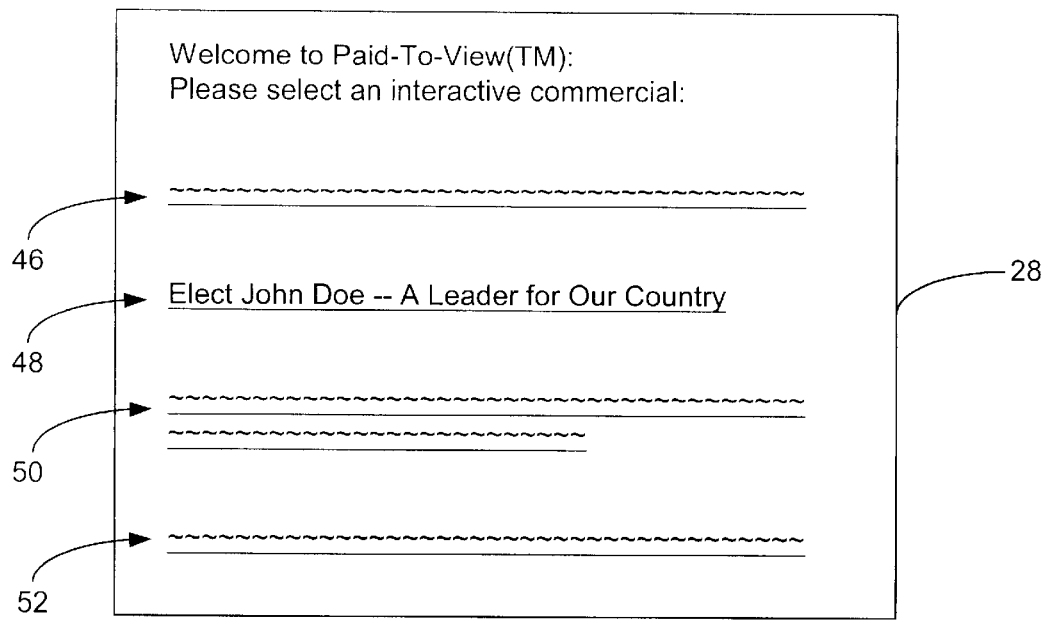
FIG. 4 illustrates an exemplary question and set of answers displayed on a use computer screen.

At step 42 user 12 logs in to the PAID-TO-VIEW™ system by entering his or her username and password into a suitable Web page form (not shown). If computer 16 verifies that user 12 is registered, i.e., that the entered username and password match those of an account 40 stored in database 20, then at step 44 computer 16 transmits a Web page that presents user 12 with an array of advertisements 24 from which to choose. As illustrated in FIG. 4, each advertisement 24 is indicated by one of exemplary tag-lines 46, 48, 50 and 52, each of which may be a description, title, slogan or other suitable indicator of the content of the advertisement 24 to which it corresponds. Each of tag-lines 46, 48, 50 and 52 has a hyperlink associated with it, as indicated by the underlined text that commonly indicates a hyperlink on a Web page. At step 54 (FIG. 3) user 12 selects an advertisement 24 by clicking on its associated tag-line. For example, user 12 may click on tag-line 48, the text of which reads "Elect John Doe—a Leader for Our Country," if user 12 is interested in an advertisement 24 that one may presume relates to a politician named John Doe. Other well-known alternatives to a hyperlink, such as a button, checkbox or selection box could similarly be used to receive the user's selection. Although in the exemplary embodiment of the invention, user 12 selects an advertisement 24 in this manner, in other embodiments user 12 may be aided by a hierarchical directory or a keyword-driven search engine to find an advertisement 24 that may be of interest.

Figure 5:
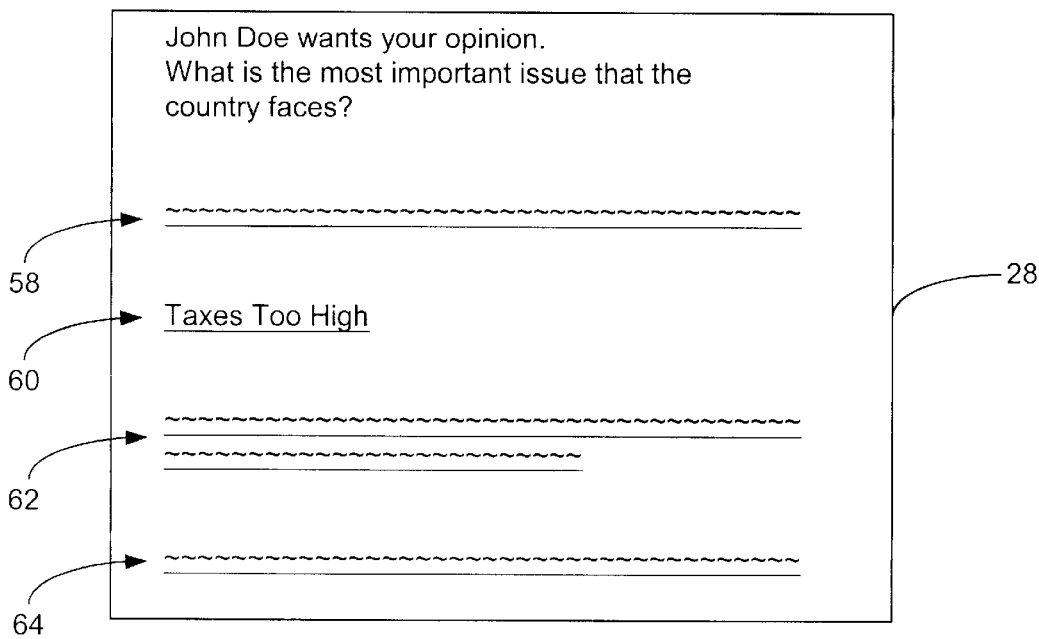
FIG. 5 illustrates another exemplary question and set of answers displayed on a user's computer screen.

In response to user 12 selecting an advertisement 24, at step 56 computer 16 generates and transmits the first Web page of the selected advertisement 24. Most or all of the Web pages of each advertisement 24 present questions for user 12 to answer. As illustrated in FIG. 5, in this example the Web page asks the following question: "John Doe wants your opinion. What is the most important issue that the country faces?" The Web page also presents several possible answers 58, 60, 62 and 64 from which user 12 may choose. Each of answers 58, 60, 62 and 64 has a hyperlink associated with it, as indicated by the underlining of its text. As noted above, other alternatives to a hyperlink could be used to receive the user's selection. At step 66 (FIG. 3) user 12 selects, for example, answer 60 by clicking on it. In this example, answer 60 indicates that user 12 believes the most important issue that the country faces is that taxes are too high.

At step 68 computer 16 determines whether the selected advertisement 24 includes further questions for user 12 to answer. If a further question exists, its corresponding Web page is generated and transmitted to computer 26 at step 56. As described above, each advertisement 24 includes an algorithm for selecting the next Web page. The next Web page is selected at least in part in response to the user's answers to one or more previous questions. The algorithm can be as straightforward as a decision tree or can be more complex. It is well-known that a decision tree is a hierarchical structure of if-then queries. In embodiments of the present invention in which the selection algorithm is a decision tree, each node of the tree represents a Web page, and the Web page at a certain node is selected for display if the questions asked of the user and the user's answers to them conform to a pattern that defines a path leading to that node. For example, if user 12 selects answer 60, indicating that high taxes are the most important issue, then computer 16, in accordance with a decision tree, selects the Web page illustrated in FIG. 6 for display.

Figure 6:
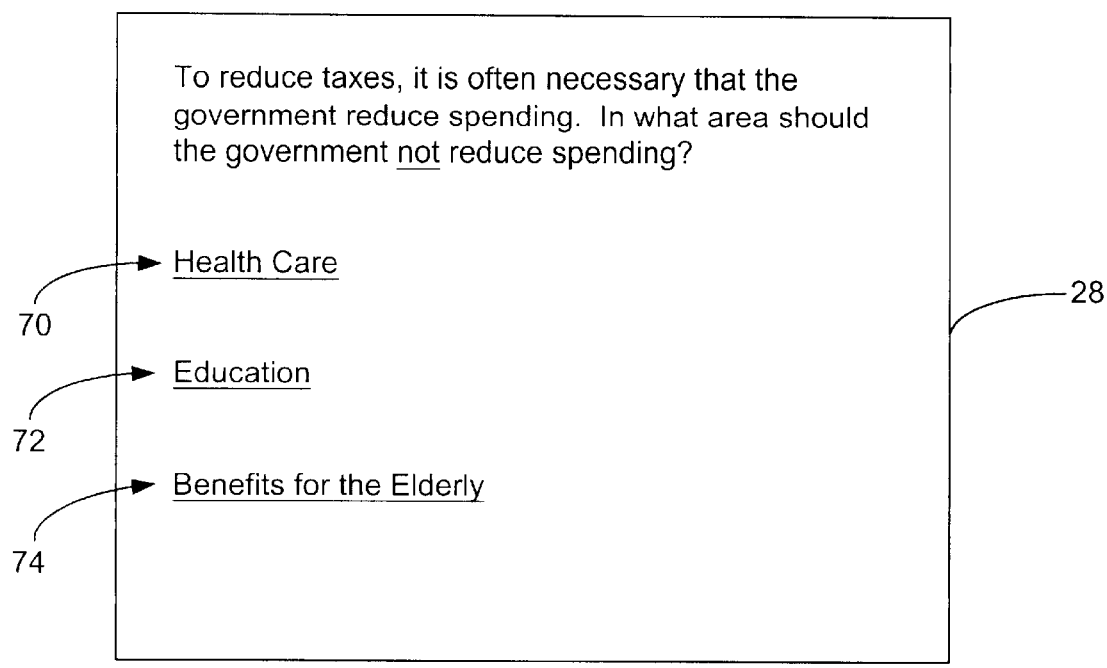
FIG. 6 illustrates still another exemplary question and set of answers displayed on a user's computer screen.

As illustrated in FIG. 6, a Web page selected in response to user 12 having selected answer 60 asks the following new question: "To reduce taxes, it is often necessary that the government reduce spending. In what area should the government not reduce spending?" The Web page also presents several possible answers 70, 72 and 74 from which user 12 may choose. These answers are, respectively: "Health Care"; "Education"; and "Benefits for the Elderly." Each of answers 70, 72 and 74 has a hyperlink associated with it, as indicated by the underlining of its text. As noted above, other alternatives to a hyperlink could be used to receive the user's selection.

As described above, the next Web page is generated or selected dynamically at least in part in response to one or more answers previously selected by user 12. Importantly, the next Web page may be selected not only in response to answers provided by user 12 but also in response to some of the demographic information that user 12 provided at the time account 40 was set up. If at step 66 (FIG. 3) user 12 selects, for example, answer 70, and if user 12 indicated as part of the demographic information that he or she was physically disabled, then computer 16 may, in accordance with such an algorithm, select as the next Web page one that asks a question relating to health care issues of particular concern to disabled persons. If user 12 selects, for example, answer 72, and if user 12 indicated as part of the demographic information that he or she has children, then computer 16 may, in accordance with such an algorithm, select as the next Web page one that asks a question relating to education issues that have specifically affected the children of user 12. If user 12 selects, for example, answer 74, and if user 12 indicated as part of the demographic information that he or she is over the age of 70, then computer 16 may, in accordance with such an algorithm, select as the next Web page one that asks user 12 to identify the specific types of government benefits that he or she receives as an elderly person.

When computer 16 determines at step 68 that there are no further Web page questions for user 12 to answer, i.e., the end of the decision tree has been reached, then computer 16 credits account 40 of user 12 at step 70. The amount of the credit may be determined by advertiser 14. Advertiser 14 may, for example, have processor 10 award more credit for viewing a lengthier interactive advertisement 24. The greater the number of advertisements 24 that user 12 views, the more the balance of his or her account 40 grows. From time to time, such as once per month, processor 10 may send user 12 a check, gift certificate or other item of value that corresponds in value to the balance of account 40 of user 12. User 12 can thus obtain cash or goods or services in payment for having viewed advertisements 24.

At step 72 computer 16 computes statistical demographic information. Certain advertisers 14 may desire such information in addition to or in lieu of more detailed information relating to specific questions and answers. This information can be as straightforward as the average (mean) number of users 12 who viewed a certain advertisement 24 within a certain time period or can be more complex. The information preferably is computed at least in part in response to the demographic information provided by user 12. For example, an advertiser 14 may desire to know the average number of users 12 over the age of 70 who viewed its advertisement 24. The information may be computed in response to specific questions. For example, an advertiser 14 may desire to know the average number of users 12 over the age of 65 who selected answer 74 (FIG. 6).

At step 74 computer 16 transmits a Web page to computer 26 that asks user 12 whether he or she would like to view another interactive advertisement 24. If user 12 returns an indication of "Yes," then computer 12 repeats the process beginning at step 44. If user 12 returns an indication of "No," computer 16 logs user 12 out of the PAID-TO-VIEW™ system.

At step 76 computer 16 transmits information to advertiser computer 22. The information preferably includes the computed statistical demographic information. Nevertheless, some advertisers 14 may desire the complete demographic information of all users 12 who responded to their advertisements 24 so that the advertisers 14 can use the information for other purposes, such as to create mailing lists. Some advertisers 14 may desire some or all of the answers that users 12 provided so that they can collect the data for later analysis.

Note that the order in which steps 70, 72, 74, 76 and other steps are performed is not critical; accounts 40 may be credited, statistical demographic information computed, and information transmitted to advertiser 14 in any suitable order and at any suitable time.

The interaction between users 12 and advertisements 14 is more engaging and thus more likely to maintain their interest than the passive advertisements provided by prior systems that reward users for viewing advertisements. Generating further questions in response to the previous answers and personal demographics of a user 12 further personalizes the advertisement and may instill in user 12 a sense that advertiser 14 is genuinely interested in the feedback that user 12 provides. Providing statistical demographic information to advertisers 14 is another valuable feature of the present invention that is a significant improvement over prior systems.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A method for compensating users for responding to advertisements, comprising the steps of:

storing a plurality of advertisements in a database of a remote computer, each advertisement provided by an advertiser;

establishing electronic communication between said remote computer and a user computer under direct control of a user;

said user setting up an account on said remote computer, including providing demographic information describing said user;

said user selecting one of said advertisements using said user computer to select from among a plurality of advertisement options said user computer indicates to the user as selectable;

said remote computer retrieving from said database a question corresponding to said selected one of said advertisements and providing said question to said user;

said user providing to said remote computer an answer in response to said question;

said remote computer retrieving from said database a further question corresponding to said selected one of said advertisements, said further question selected at least in part in response to an answer;

repeating said steps of said remote computer retrieving from said database a question and said user providing to said remote computer an answer until no further questions correspond to said selected one of said advertisements;

crediting said account in response to said user having provided answers in response to questions; and said remote computer transmitting said answers to said advertiser.

2. A method for compensating users for responding to advertisements, comprising the steps of:

storing a plurality of advertisements in a database of a remote computer, each advertisement provided by an advertiser;

establishing electronic communication between said remote computer and a user computer under direct control of a user;

said user setting up an account on said remote computer, including providing demographic information describing said user;

said user selecting one of said advertisements using said user computer to select from among a plurality of advertisement options said user computer indicates to the user as selectable;

said remote computer retrieving from said database a question corresponding to said selected one of said advertisements and providing said question to said user;

said user providing to said remote computer an answer in response to said question;

said remote computer retrieving from said database a further question corresponding to said selected one of said advertisements, said further question selected at least in part in response to an answer;

repeating said steps of said remote computer retrieving from said database a question and said user providing to said remote computer an answer until no further questions correspond to said selected one of said advertisements;

crediting said account in response to said user having provided answers in response to questions;

said remote computer computing statistical information in response to said demographic information and said answers; and said remote computer transmitting said statistical information to said advertiser.

3. A system for compensating users for responding to advertisements, comprising:

a plurality of user computers, each under direct control of a user;

a remote computer remote from said user computers and having a database in which is stored a plurality of advertisements, each advertisement provided by an advertiser, said remote computer programmed to include:

means for establishing electronic communication between said remote computer and said user computer;

means for setting up an account on said remote computer in which a user provides demographic information describing said user;

means for said user to select one of said advertisements using said user computer to select from among a plurality of advertisement options said user computer indicates to said user as selectable;

means for said remote computer to retrieve from said database a question corresponding to said selected one of said advertisements and for said remote computer to provide said question to said user;

means for said user to provide to said remote computer an answer in response to said question;

means for said remote computer to retrieve from said database a further question corresponding to said selected one of said advertisements, said further question selected at least in part in response to an answer;

means for said remote computer to continue to retrieve from said database a question and said user to continue to provide to said remote computer an answer until no further questions correspond to said selected one of said advertisements;

means for said remote computer to credit said account in response to said user having provided answers in response to questions; and means for said remote computer to transmit said answers to said advertiser.

4. A system for compensating users for responding to advertisements, comprising:

a plurality of user computers, each under direct control of a user;

a remote computer remote from said user computers and having a database in which is stored a plurality of advertisements, each advertisement provided by an advertiser, said remote computer programmed to include:

means for establishing electronic communication between said remote computer and said user computer;

means for setting up an account on said remote computer in which a user provides demographic information describing said user;

means for said user to select one of said advertisements using said user computer to select from among a plurality of advertisement options said user computer indicates to said user as selectable;

means for said remote computer to retrieve from said database a question corresponding to said selected one of said advertisements and for said remote computer to provide said question to said user;

means for said user to provide to said remote computer an answer in response to said question;

means for said remote computer to retrieve from said database a further question corresponding to said selected one of said advertisements, said further question selected at least in part in response to an answer;

means for said remote computer to continue to retrieve from said database a question and said user to continue to provide to said remote computer an answer until no further questions correspond to said selected one of said advertisements;

means for said remote computer to credit said account in response to said user having provided answers in response to questions;

means for said remote computer to compute statistical information in response to said demographic information and said answers; and means for said remote computer to transmit said statistical information to said advertiser.

5. A method for compensating users for responding to advertisements, comprising:

storing a plurality of advertisements in a database of a remote computer;

establishing electronic communication between said remote computer and a user computer under direct control of a user;

said user setting up an account;

said user selecting one of said advertisements stored in said database using said user computer to select from among a plurality of advertisement options said user computer indicates to the user as selectable;

said remote computer presenting to said user via said user computer in succession a plurality of questions corresponding to said selected one of said advertisements, each question of said plurality of questions selected at least in part in response to an answer provided by said user via said user computer to a previous question; and crediting said account in response to said user having provided answers in response to questions.

* * * * *